United States Patent
Tarasuk-Levin et al.

(10) Patent No.: US 9,507,623 B2
(45) Date of Patent: Nov. 29, 2016

(54) HANDLING DISK STATE INHERITANCE FOR FORKED VIRTUAL MACHINES

(71) Applicant: VMware, Inc., Palo Alto, CA (US)

(72) Inventors: Gabriel Tarasuk-Levin, Sunnyvale, CA (US); Jayanth Gummaraju, San Francisco, CA (US); Hui Li, Fremont, CA (US); Li Zheng, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/570,336

(22) Filed: Dec. 15, 2014

(65) Prior Publication Data

US 2016/0170788 A1 Jun. 16, 2016

(51) Int. Cl.
*G06F 9/455* (2006.01)
*G06F 3/06* (2006.01)

(52) U.S. Cl.
CPC ......... *G06F 9/45558* (2013.01); *G06F 3/0604* (2013.01); *G06F 3/065* (2013.01); *G06F 3/0664* (2013.01); *G06F 3/0683* (2013.01); *G06F 2009/4557* (2013.01)

(58) Field of Classification Search
CPC .......................... G06F 9/45558; G06F 3/0604
USPC ...................................................... 718/1–108
See application file for complete search history.

(56) References Cited

U.S. PATENT DOCUMENTS

| | | | |
|---|---|---|---|
| 6,618,736 B1 * | 9/2003 | Menage ................ | G06F 3/0601 |
| 7,647,468 B2 * | 1/2010 | Leis ...................... | G06F 9/5077 711/173 |
| 8,181,174 B2 * | 5/2012 | Liu ...................... | G06F 9/44505 717/121 |
| 8,458,695 B2 * | 6/2013 | Fitzgerald ............... | G06F 9/455 713/164 |
| 8,478,801 B2 * | 7/2013 | Hutchins ........... | G06F 17/30115 707/803 |
| 8,719,767 B2 * | 5/2014 | Bansod .................... | G06F 8/71 717/101 |
| 8,752,047 B2 * | 6/2014 | Banga .................... | G06F 21/53 718/1 |
| 8,856,078 B2 * | 10/2014 | Knowles ............. | G06F 9/45558 707/649 |
| 8,898,668 B1 * | 11/2014 | Costea ................ | G06F 9/45558 709/203 |
| 8,904,081 B1 * | 12/2014 | Kulkarni ................ | G06F 3/065 711/170 |
| 8,949,826 B2 * | 2/2015 | Fitzgerald ........... | G06F 9/45537 718/1 |
| 8,972,980 B2 * | 3/2015 | Banga ................... | G06F 9/5027 709/222 |
| 9,323,565 B2 * | 4/2016 | Li ....................... | G06F 9/45558 |

OTHER PUBLICATIONS

Chen et al, "Empirical Study of Application Runtime Performance using On-demand Streaming Virtual Disks in the Cloud", ACM, pp. 1-6, 2012.*
Kazim et al, "Securing the virtual machine images in Cloud computing", ACM, pp. 425-428, 2013.*
Basu et al, "LVD: Lean Virtual Disks", ACM, pp. 24-36, 2014.*

(Continued)

*Primary Examiner* — Anil Khatri

(57) ABSTRACT

Techniques for handling inheritance of disk state when forking virtual machines (VMs) are provided. In one embodiment, a computer system can receive a request to fork a child VM from a parent VM. In response, the computer system can take a disk snapshot of the parent VM, where the disk snapshot results in a child disk for the child VM, where the child disk is a delta disk that points to a parent disk of the parent VM, and where the parent disk serves as the parent VM's current running point. The computer system can then determine whether the parent disk is a delta disk. If so, the computer system can copy the content of the parent disk to the child disk, traverse a disk hierarchy associated with the parent disk to identify a base disk above the parent disk in the hierarchy, and cause the child disk to point directly to the base disk.

15 Claims, 6 Drawing Sheets

(56) References Cited

OTHER PUBLICATIONS

Hansen et al, "Scalable Virtual Machine Storage using Local Disks", ACM, vol. 44, issue 4, pp. 71-79, 2010.*
Svard et al, "Evaluation of Delta Compression Techniques for Efficient Live Migration of Large Virtual Machines", ACM, pp. 111-120, 2011.*
Jin et al, "The Effectiveness of Deduplication on Virtual Machine Disk Images", ACM, pp. 1-12, 2009.*
Jayanth Gummaraju et al, "Elastic Compute Fabric Using Virtual Machine Templates", U.S. Appl. No. 14/136,621, filed Dec. 20, 2013.
Gabriel Trasuk-Levin et al, "Fast Instantiation of Virtual Machines", U.S. Appl. No. 14/136,661, filed Dec. 20, 2013.
Hui Li et al, "Provisioning Customized Virtual Machine withouth Rebooting", U.S. Appl. No. 14/136,701, filed Dec. 20, 2013.
Hui Li et al, "State Customization of Forked Virtual Machines", U.S. Appl. No. 14/136,741, filed Dec. 20, 2013.

* cited by examiner

US 9,507,623 B2

HANDLING DISK STATE INHERITANCE FOR FORKED VIRTUAL MACHINES

BACKGROUND

As known in the field of computer virtualization, virtual machine forking (referred to herein as "VM forking") is a technology that allows a running virtual machine (VM) to be split, or "forked," into one or more child VM instances, each inheriting the memory, virtual device, and disk state of the original (i.e., parent) VM. An implementation of this technology is disclosed in commonly assigned U.S. patent application Ser. Nos. 14/136,621, 14/136,661, 14/136,701, 14/136,741, filed Dec. 20, 2013.

In existing VM forking implementations, memory is inherited via copy-on-write techniques, virtual device state is inherited using cached checkpoints, and disk state is inherited using disk snapshots. With respect to disk state inheritance, at the time a child VM is forked from a parent VM, a snapshot is taken of the parent VM's current running point (i.e., the virtual disk that the parent VM is configured to currently write to, referred to as a "parent disk"), which results in the creation of a delta disk pointing to that parent disk. The delta disk (referred to as a "child disk") is then provided to the child VM as the child VM's current running point, thereby allowing the child VM to access the parent VM's disk state by virtue of the relationship between the parent and child disks. This relationship can be understood as forming (or being part of) a disk hierarchy, where the parent disk corresponds to a parent node in the hierarchy and the child disk corresponds to a child node of the parent node in the hierarchy. Both the memory state and the disk state of the child VM are shared with the parent VM via copy-on-write techniques. The child VM may read the parent disk. However, any write operations will be directed to the delta disk ("the child disk").

SUMMARY

Techniques for handling inheritance of disk state when forking VMs are provided. In one embodiment, a computer system can receive a request to fork a child VM from a parent VM. In response, the computer system can take a disk snapshot of the parent VM, where the disk snapshot results in a child disk for the child VM, where the child disk is a delta disk that points to a parent disk of the parent VM, and where the parent disk serves as the parent VM's current running point. The computer system can then determine whether the parent disk is a delta disk. If so, the computer system can copy the content of the parent disk to the child disk, traverse a disk hierarchy associated with the parent disk to identify a base disk above the parent disk in the hierarchy, and cause the child disk to point directly to the base disk.

The following detailed description and accompanying drawings provide a better understanding of the nature and advantages of particular embodiments.

DETAILED DESCRIPTION

Figure 1:
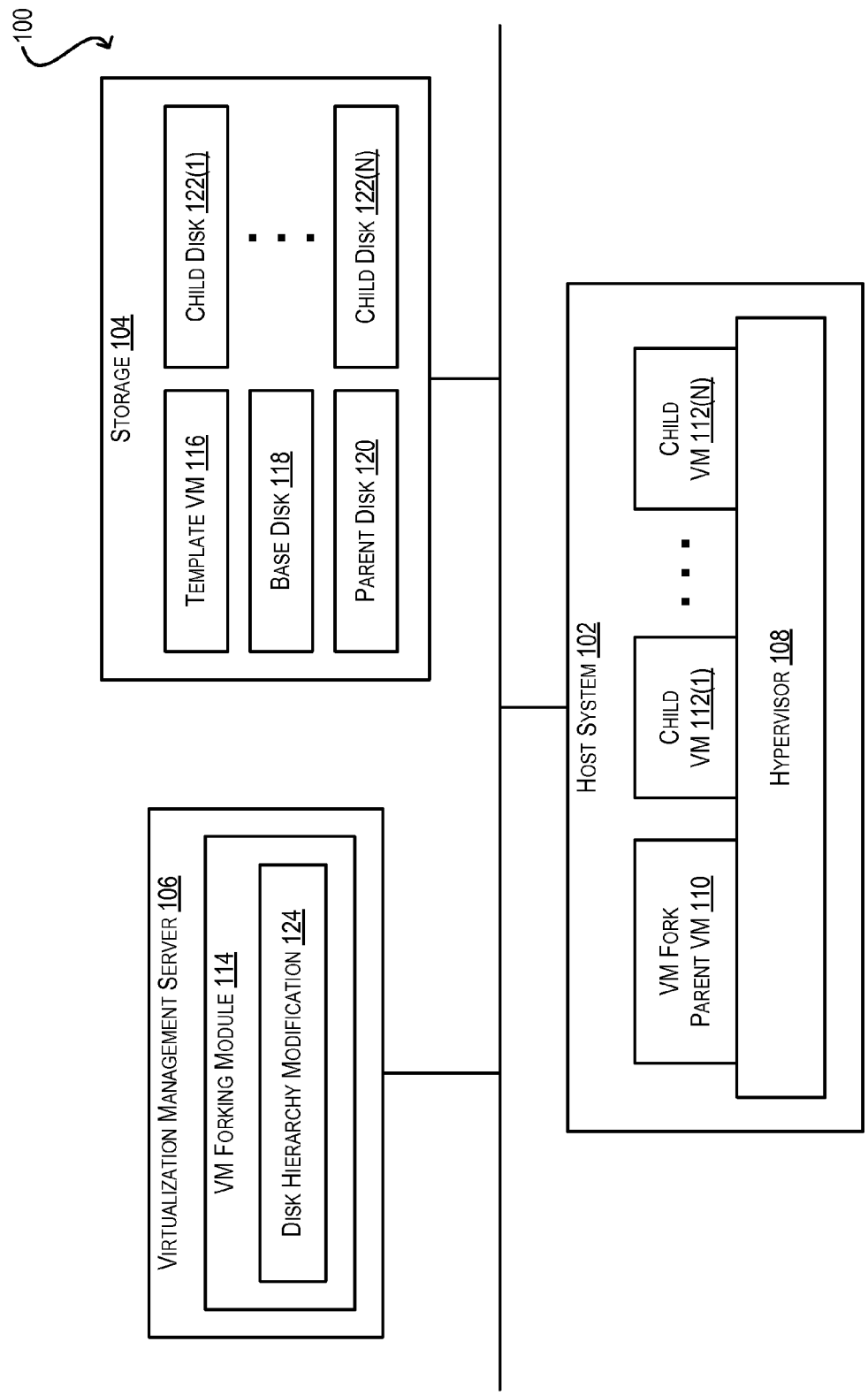
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes enhanced techniques for handling disk state inheritance when a child VM is forked from a parent VM (e.g., using VM forking technology). One drawback of the conventional disk state inheritance approach described in the Background section is that it increases the depth (i.e., number of levels) of the disk hierarchy for each successive generation of forked child VMs. For example, if the parent disk is "flat"—in other words, the parent disk is not a delta disk, and thus resides at the root of the disk hierarchy (i.e., at a depth of 0)—the child disks of first-generation child VMs forked from the parent VM will reside at a disk hierarchy depth of 1, since those first-generation child disks will descend from the parent disk. Further, the child disks of second-generation child VMs forked from a first generation child VM will reside at a disk hierarchy depth of 2, since those second-generation child disks will descend from a first-generation child disk, and so on for successive generations. The problem with this increase in hierarchy depth is that, as each additional level is added to the disk hierarchy, the disk I/O performance of the VMs associated with the disks at that level is significantly reduced (due to, e.g., the need to access parent disks on the path to the root). Accordingly, this performance degradation can make repeated, chained use of VM forking impractical.

Even in scenarios where child VMs do not need to be forked in chained succession, the additional hierarchy levels created by conventional disk state inheritance can cause performance problems if the current running point of a VM fork parent VM is already a delta disk (and thus resides at a non-zero depth in the disk hierarchy) due to some other mechanism, such as conventional snapshots or linked cloning. For instance, consider a typical VM forking usage pattern in a virtual desktop infrastructure (VDI) deployment. In this usage pattern, there is usually a powered-off template VM with a base disk (which represents the master copy of the virtual desktop installation to be delivered to end-users) and a number of per-host parent VMs that are created as linked clones of the template VM. A linked clone of the template VM is a copy of the existing template VM made from a snapshot of the template VM. All files available on the template VM at the moment of the snapshot continue to remain available to the linked clone. Ongoing changes to the disk of the linked clone do not affect the template VM. Each per-host parent VM is powered-on on its respective host system and forked using VM forking to create child VMs. The end-users then login to the child VMs to access their desktop sessions. Since the per-host parent VMs are linked clones of the template VM, their respective running points are delta disks that point to the template VM's base disk, and thus already incur a performance penalty due to being one level down in the disk hierarchy. When a child VM is forked from a per-host parent VM, its child disk incurs a further performance penalty due to being yet another level down in the disk hierarchy (i.e., below the per-host parent VM's disk). This further penalty, when stacked on top of the parent disk-level penalty, may cause the disk I/O performance of the child VM to cross a threshold from "acceptable" to "unacceptable" for end-users.

To address the foregoing and other similar issues, the techniques described herein allow the child VM to inherit the parent VM's disk state in a manner that does not increase the depth of the disk hierarchy comprising the child and parent VMs' virtual disks, thereby eliminating the performance issues arising from such a depth increase. For instance, in one set of embodiments, a computer system (e.g., a virtualization management server) can take, at the time of forking the child VM from the parent VM, a snapshot of the parent VM's current running point (i.e., parent disk), which creates a delta disk for the child VM (i.e., child disk) pointing to the parent disk. The virtualization management server can further copy the content of the parent disk to the child disk, such that the content of those two disks are made identical. Once this copying is completed, the virtualization management server can identify a base disk above the parent disk in the parent disk's disk hierarchy, and can modify (i.e., re-parent) the child disk to point directly to the base disk, rather than to the parent disk. In this way, the virtualization management server can effectively make the child disk a sibling of the parent disk in the disk hierarchy, which prevents the depth of the hierarchy from increasing along the fork path.

To illustrate this, consider an example scenario (similar to the VDI scenario discussed earlier) where: (1) a VM fork parent VM P is created as a linked clone of a template VM T having a base disk D1, such that VM P's current running point is a delta disk, or parent disk, D2 pointing to D1, and (2) a child VM C is subsequently forked from VM P. In this scenario, the virtualization management server can take a disk snapshot of VM P and thereby create a delta disk, or child disk, D3 pointing to D2. The virtualization management server can then copy the content of D2 to D3. Finally, the virtualization management server can identify D1 as being a parent of D2 in the disk hierarchy, and can re-parent D3 to point directly to D1. The end result of this process is a two-level (rather than three-level) disk hierarchy, with D1 at the root level (i.e., depth of 0) and D2 and D3 both at the same level below the root level (i.e., depth of 1). If VM C is subsequently forked to create an additional child VM C2, the same process can be repeated to add the child disk for VM C2 as a sibling of D2 and D3 at depth 1 of the disk hierarchy, rather than adding an additional level to the hierarchy.

It should be noted that the techniques of the present disclosure assume the parent disk is a delta disk and thus resides at a non-zero depth in the disk hierarchy (as used herein, the "depth" of the disk hierarchy is considered to be 0 for the root level of the hierarchy, and increases by 1 for each additional level below the root level). This assumption will be true if, e.g., the parent VM is a linked clone of another VM (per the example scenario above), the parent VM is a forked child of another VM, or the parent VM has otherwise been snapshotted previously.

Further, these techniques assume that it is preferable to incur the storage overhead caused by copying the entirety of the parent disk to the child disk at the point of forking, over the performance overhead caused by adding another level to the disk hierarchy. Generally speaking, this assumption will be reasonable in cases where storage space is not a limiting factor (e.g., the storage tier is implemented using one or more dedicated storage arrays), and/or where the parent VM is not expected to issue a significant amount of I/O to its parent disk prior to forking The latter case will typically be true in deployments like VDI where the parent VMs are created solely for forking purposes, and thus are usually quiesced immediately after boot. Additionally, the parent-to-child disk copying behavior can be explained to VM fork users, and these users can be encouraged to isolate disk content in the base disk above the parent disk prior to creating the parent VM, thereby minimizing the size of the parent disk for forking purposes.

The foregoing and other aspects of the present disclosure are described in further detail in the sections that follow.

2. System Environment

FIG. 1 depicts a system environment 100 that supports enhanced disk state inheritance handling for VM forking according to an embodiment. As shown, system environment 100 includes a host system 102 that is communicatively coupled with a storage component 104 and a virtualization management server 106.

Host system 102 is a computer system (e.g., a rack-mounted or standalone server) that provides virtualized compute resources within system environment 100. For example, host system 102 includes a hypervisor 108 upon which one or more VMs (e.g., VM fork parent VM 110 and child VMs 112(1)-112(N)) can run. Although a single host system is depicted in FIG. 1, it should be appreciated that any number of such host systems may be supported.

Storage component 104 is a device or combination of devices that provide storage resources within system environment 100. For instance, storage component 104 can be used to store the virtual disks and configuration files of the VMs running on host system 102 (and other host systems). In one embodiment, storage component 104 can be implemented using a dedicated storage array (e.g., a SAN or NAS-based array). In other embodiments, storage component 104 can be implemented using commodity storage devices, such as commodity hard disks or flash disks, that are either remote or local to host system 102.

Virtualization management server 106 is a computer system that can perform various administrative and management tasks with respect to host system 102, storage component 104, and the VMs/data hosted thereon. For example, virtualization management server 106 can carry out or facilitate VM lifecycle management, hardware monitoring, load balancing, and so on. In the specific embodiment of FIG. 1, virtualization management server 106 includes a VM forking module 114. Using module 114, virtualization management server 106 can fork a VM running on host system 102 (i.e., VM fork parent VM 110) into one or more child VMs (i.e., child VMs 112(1)-112(N)). Each child VM 112(1)-112(N) inherits the memory, virtual device, and disk state of parent VM 110, such that the child VM starts off at the exact same execution point as the parent VM. Parent VM 110 is typically quiesced prior to being forked and remains quiesced indefinitely thereafter. This prevents parent VM 110 from modifying its memory and disk state once child VMs 112(1)-112(N) are active, which can potentially corrupt the child VMs' inherited state information.

As noted in the Background section, existing VM forking implementations handle disk state inheritance via an approach that increases the depth of the disk hierarchy associated with the parent/child VMs for each generation of forked children. For example, according to such existing implementations, if parent VM 110 is forked to create a particular child VM 112(X), a snapshot of the current running point of parent VM 110 (i.e., parent disk 120 on storage component 104) will be taken, which will generate a delta disk for the child VM (i.e., child disk 122(X) on storage component 104) that points to parent disk 120. Child disk 122(X) will then be provided to child VM 112(X) as its current running point. The problem with this conventional approach is that, since newly created child disk 122(X) resides at a disk hierarchy level below parent disk 120, child VM 112(X) will exhibit significantly worse I/O performance than parent VM 120. This performance problem is exacerbated if further generations of child VMs are forked in succession from child VMs 112(1)-112(N), because those further generations will have child disks that reside at yet further levels down the disk hierarchy (one level per generation).

In addition, even if only a single generation of child VMs 112(1)-112(N) is forked from parent VM 110, parent disk 120 of parent VM 110 may itself be a delta disk, and thus may reside at a non-zero depth of the disk hierarchy. For instance, assume parent VM 110 is a linked clone of a powered-off template VM 116 having a base disk 118. Template VM 116 may be, e.g., a "golden image" VM in a VDI deployment. In this scenario, parent disk 120 will be a delta disk that points to base disk 118, and thus will reside at a disk hierarchy depth of at least 1 (assuming base disk 118 is at the hierarchy root). Note that, in some cases, there may be additional delta disks (and thus additional hierarchy levels) between parent disk 120 and base disk 118; for example, in a particular embodiment, a snapshot may be taken of parent VM 110 before it is powered-on (e.g., to provide a known restart point in the case of a crash), resulting in an empty delta disk above parent disk 120 and below base disk 118.

Figure 2:
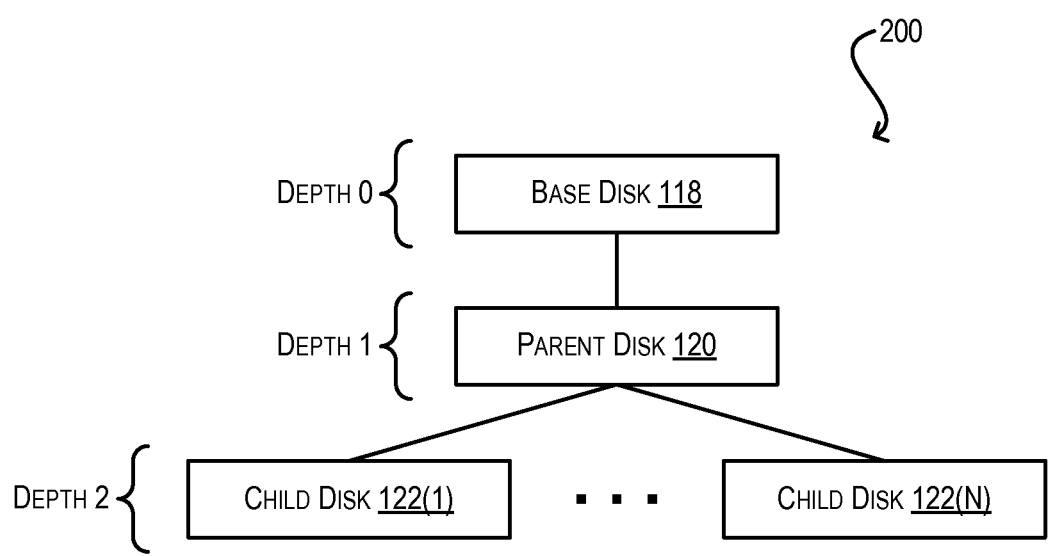
FIG. 2 depicts an example disk hierarchy.

Then, when child VMs 112(1)-112(N) are forked from parent VM 110 via the conventional approach described above, the child disks 122(1)-122(N) for those child VMs will necessarily reside at a disk hierarchy depth of at least 2, which is one level below parent disk 120 and at least two levels below base disk 118 (shown in hierarchy 200 of FIG. 2). This can be problematic for several reasons. For example, if child VMs 112(1)-112(N) are user-facing VMs, the performance penalty caused by the two (or more) disk hierarchy levels between child disks 122(1)-122(N) and base disk 118 may be too high to allow for an acceptable user experience.

To address these and other similar problems, VM forking module 114 of FIG. 1 can include a novel disk hierarchy modification module 124. As described in further detail below, disk hierarchy modification module 124 can execute a workflow at the time of forking a child VM 112(X) from parent VM 110 that copies the content of parent disk 120 into child disk 122(X), and then re-parents child disk 122(X) to directly descend from base disk 118 (rather than from parent disk 120). In this manner, module 124 can avoid increasing the depth of the disk hierarchy along the fork path and thereby improve the disk I/O performance of child VM 112(X).

It should be appreciated that FIG. 1 is illustrative and not intended to limit the embodiments herein. For example, the various components depicted in host system 100 may have other capabilities/functions or include other subcomponents that are not described. Further, although a particular arrangement of these components is shown, other arrangements and configurations are also possible. One of ordinary skill in the art will recognize many variations, modifications, and alternatives.

3. Disk State Inheritance Workflow

Figure 3:
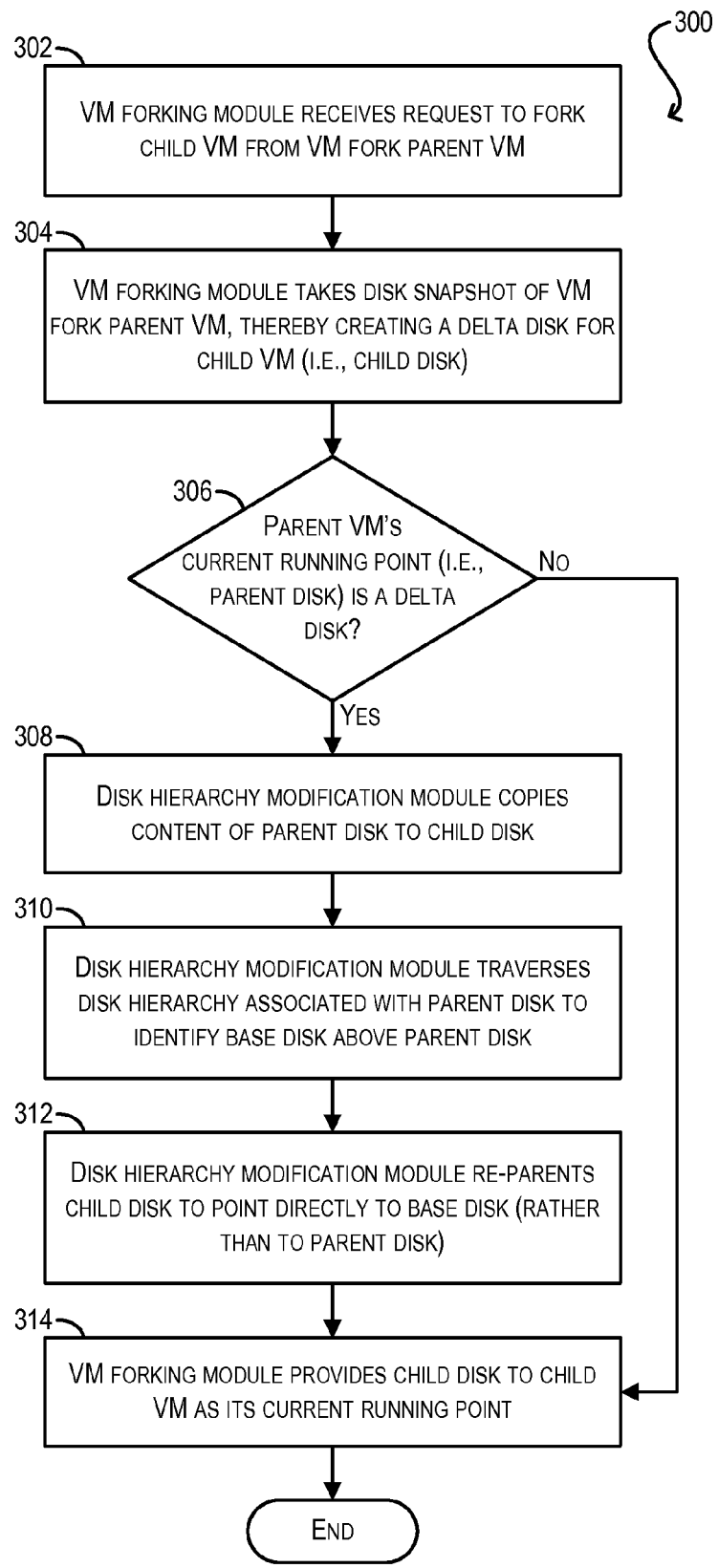
FIG. 3 depicts a flowchart for handling disk state inheritance for a forked child VM according to an embodiment.

FIG. 3 depicts a flowchart 300 that can be performed by VM forking module 114/disk hierarchy modification module 124 of FIG. 1 for implementing the enhanced disk state inheritance techniques of the present disclosure. Flowchart 300 assumes that a user or automated agent has generated a request to fork a child VM (e.g., 112(X)) from a parent VM (e.g., 110).

Starting with block 302, VM forking module 114 can receive the request to fork child VM 112(X) from parent VM 110. At block 304, VM forking module 114 can take a snapshot of the current running point of parent VM 110 (e.g., parent disk 120), thereby creating a delta disk for child VM 112(X) (e.g., child disk 122(X)) that points to parent disk 120.

Once child disk 122(X) has been created, VM forking module 114 can determine whether parent disk 120 is a delta disk or not (block 306). In one embodiment, this step can comprise checking whether parent disk 120 is part of a disk hierarchy that includes one or more disks above parent disk 120. If VM forking module 114 determines that parent disk 120 is not a delta disk at block 306, VM forking module 114 can provide child disk 122(X) to child VM 112(X) as its current running point (block 314) and flowchart 300 can end.

On the other hand, if VM forking module 114 determines that parent disk 120 is a delta disk at block 306, VM forking module 114 can invoke disk hierarchy modification module 124. In response, disk hierarchy modification module 124 can first copy the content of parent disk 120 to child disk 122(X) (block 308). The content of parent disk 120 will generally include I/O writes that were issued by parent VM 110 between the time at which the VM was powered-on and the time at which the VM was quiesced (prior to forking). In some embodiments, to keep the size of parent disk 120 low, parent VM 110 may be quiesced immediately after being booted-up, and thus parent disk 120 may only include I/O writes issued by parent VM 110 during its boot process.

Then, at block 310, disk hierarchy modification module 124 can traverse the disk hierarchy associated with parent disk 120 to identify a base disk (e.g., 118) above parent disk 120. In one embodiment, this step can comprise walking up the hierarchy from parent disk 120 to the root and identifying the first non-empty disk along that path as the base disk.

Finally, at block 312, disk hierarchy modification module 124 can re-parent child disk 122(X) created at block 304 to point directly to the base disk identified at block 310 (rather than to parent disk 120). With this step, disk hierarchy modification module 124 can effectively collapse the path between child disk 122(X) and the base disk in a way that removes parent disk 120 from that path. VM forking module 114 can subsequently provide re-parented child disk 122(X) to child VM 112(X) as its current running point (block 314) and flowchart 300 can end.

Figure 4:
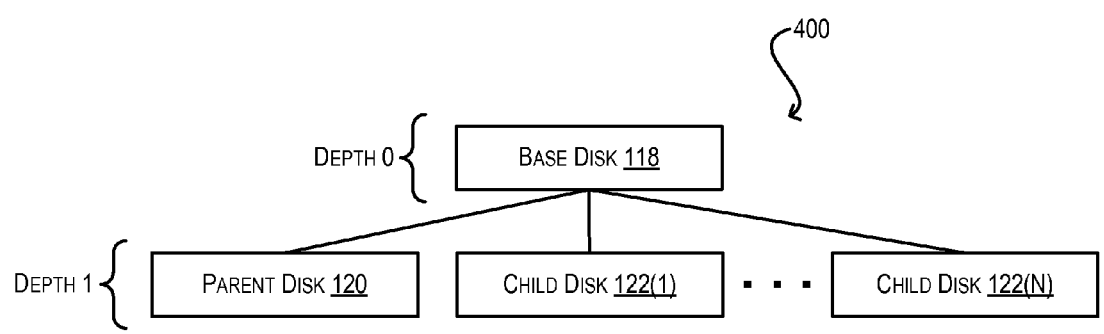
FIG. 4 depicts an example disk hierarchy created as a result of the flowchart of FIG. 3 according to an embodiment.

By way of example, FIG. 4 depicts a disk hierarchy 400 that may be created via the processing of flowchart 300 in a scenario where parent VM 120 is a linked clone of template VM 116 of FIG. 1, and where child VMs 112(1)-112(N) are forked from parent VM 120. As shown in FIG. 4, parent disk 120 is a child of the template VM's base disk 118, but child disks 122(1)-122(N) are not children of parent disk 120 (as they are in hierarchy 200 of FIG. 2). Instead, child disks 122(1)-122(N) are siblings of parent disk 120 and descend directly from base disk 118. If further generations of child VMs are subsequently forked from child VMs 112(1)-112(N), their child disks will be cloned and re-parented in a similar fashion as child disks 122(1)-122(N), such that those successive-generation child disks will still reside at the same disk hierarchy level as parent disk 120 and child disks 122(1)-122(N) (e.g., depth 1 in FIG. 4).

4. Child Disk Verification

In some situations, a child VM may be forked form a parent VM per flowchart 300 of FIG. 3, but the child VM may not be immediately powered-on. In these situations, if the host system crashes before the child VM is powered-on, the parent VM will generally revert to a previous state (e.g., a previous snapshot), recreate its parent disk, and boot up again, thereby performing new writes to the recreated parent disk in the process. This has two consequences: (1) the new parent disk will not have the same content as the old parent disk, and (2) if the previously-forked child VM is powered-on, its child disk (which was copied from the old parent disk) will not match the new parent disk, resulting in potential corruption of the child VM (since the disk state of the child VM will be out of sync with its memory state, which is shared with the parent VM via copy-on-write).

To address this problem, in certain embodiments the hypervisor of the host system running the parent and child VMs can implement a novel child disk verification module. An example of this module is shown via reference numeral 502 in FIG. 5. At a high level, child disk verification module 502 can ensure that the child disk for a forked child VM is consistent with the parent VM's parent disk, at the time the child VM is powered-on. Thus, child disk verification module 502 can avoid child VM corruption in the host crash scenario described above (and other similar scenarios).

Figure 5:
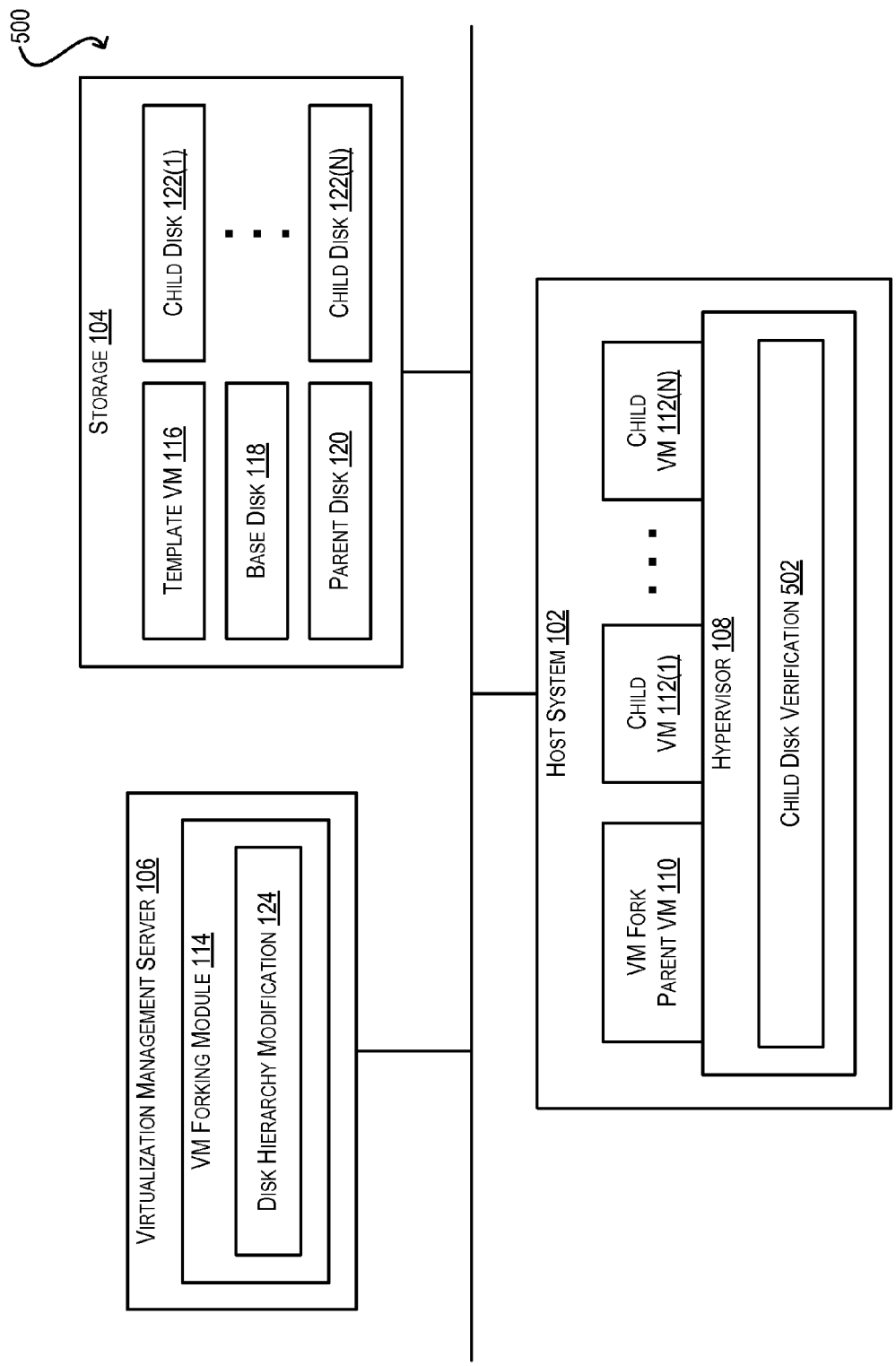
FIG. 5 depicts a modified version of the system environment of FIG. 1 according to an embodiment.
Figure 6:
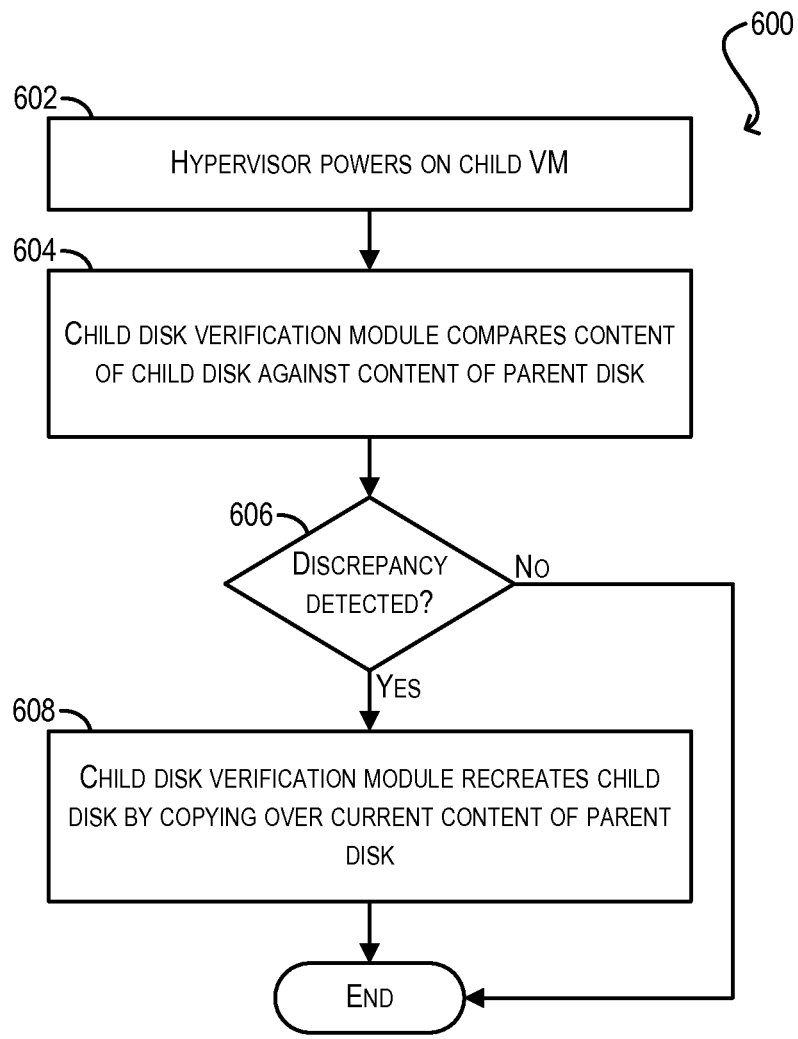
FIG. 6 depicts a flowchart for verifying the content of a child disk against a parent disk according to an embodiment.

FIG. 6 depicts a flowchart 600 that can be performed by hypervisor 108/child disk verification module 502 of FIG. 5 for verifying child disk integrity for a child VM (e.g., 112(X)) forked from a parent VM (e.g., 110) according to an embodiment. Starting with block 602, hypervisor 108 can power-on child VM 112(X). At block 604, child disk verification module 502 can compare the content of the child VM's child disk (e.g., child disk 122(X)) against the content of the parent VM's parent disk (e.g., parent disk 120). There are a number of different ways in which child disk verification module 502 can perform this comparison. For instance, in a particular embodiment, child disk verification module 502 can compare pre-calculated content IDs associated with disks 122(X) and 120 respectively, where the content IDs are hash-based checksums of those disks that are generated automatically during the snapshot process. In alternative embodiments, child disk verification module 502 can calculate its own checksums for disks 122(X) and 120 and can compare those self-calculated values.

If child disk verification module 502 determines that there is no discrepancy between the content of the child and parent disks (block 606), flowchart 600 can end.

On the other hand, if child disk verification module 502 determines that there is a discrepancy between the content of the child and parent disks (block 606), child disk verification module 502 can recreate child disk 122(X) by re-copying over the content of parent disk 120 to child disk 122(X) (block 608). In this way, child disk verification module 502 can ensure that child disk 122(X) is consistent with the current version of parent disk 120. Flowchart 600 can then end, and hypervisor 108 can resume its normal power-on process.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/0, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for handling inheritance of disk state when forking virtual machines (VMs), the method comprising:
   receiving, by a computer system, a request to fork a child VM from a parent VM;
   taking, by the computer system, a disk snapshot of the parent VM, the disk snapshot resulting in a child disk for the child VM, the child disk being a delta disk that points to a parent disk associated with the parent VM, the parent disk serving as the parent VM's current running point;
   determining, by the computer system, whether the parent disk is a delta disk; and
   if the parent disk is a delta disk:
      copying content of the parent disk to the child disk;
      traversing a disk hierarchy associated with the parent disk to identify a base disk above the parent disk in the disk hierarchy; and
      causing the child disk to point directly to the base disk,
   wherein, upon powering on the child VM on a host system, the host system is configured to:
      compare the content of the child disk against the content of the parent disk; and
      if the content of the child disk does not match the content of the parent disk, recreate the child disk by re-copying the content of the parent disk to the child disk.

2. The method of claim 1 wherein the parent VM is a linked clone of another VM that is associated with the base disk.

3. The method of claim 1 wherein the parent VM is quiesced immediately after being booted up, such that the parent disk solely comprises I/O writes issued during the parent VM's boot process.

4. The method of claim 1 wherein the base disk is the first non-empty disk above the parent disk in the disk hierarchy.

5. The method of claim 1 further comprising:
   receiving a request to fork a second-level child VM from the child VM;
   taking a disk snapshot of the child VM, the disk snapshot resulting in a second-level child disk for the second-level child VM, the second-level child disk being a delta disk that points to the child disk;
   copying content of the child disk to the second-level child disk; and
   causing the second-level child disk to point directly to the base disk.

6. A non-transitory computer readable storage medium having stored thereon program code executable by a computer system, the program code embodying a method for handling inheritance of disk state when forking VMs, the method comprising:
   receiving a request to fork a child VM from a parent VM;
   taking a disk snapshot of the parent VM, the disk snapshot resulting in a child disk for the child VM, the child disk being a delta disk that points to a parent disk associated with the parent VM, the parent disk serving as the parent VM's current running point;
   determining whether the parent disk is a delta disk; and
   if the parent disk is a delta disk:
      copying content of the parent disk to the child disk;
      traversing a disk hierarchy associated with the parent disk to identify a base disk above the parent disk in the disk hierarchy; and
      causing the child disk to point directly to the base disk,
   wherein, upon powering on the child VM on a host system, the host system is configured to:
      compare the content of the child disk against the content of the parent disk; and
      if the content of the child disk does not match the content of the parent disk, recreate the child disk by re-copying the content of the parent disk to the child disk.

7. The non-transitory computer readable storage medium of claim 6 wherein the parent VM is a linked clone of another VM that is associated with the base disk.

8. The non-transitory computer readable storage medium of claim 6 wherein the parent VM is quiesced immediately after being booted up, such that the parent disk solely comprises I/O writes issued during the parent VM's boot process.

9. The non-transitory computer readable storage medium of claim 6 wherein the base disk is the first non-empty disk above the parent disk in the disk hierarchy.

10. The non-transitory computer readable storage medium of claim 6 wherein the method further comprises:
  receiving a request to fork a second-level child VM from the child VM;
  taking a disk snapshot of the child VM, the disk snapshot resulting in a second-level child disk for the second-level child VM, the second-level child disk being a delta disk that points to the child disk;
  copying content of the child disk to the second-level child disk; and
  causing the second-level child disk to point directly to the base disk.

11. A computer system comprising:
  a processor;
  a VM forking module configured to receive a request to fork a child VM from a parent VM; and
  a disk hierarchy modification module configured to, in response to the request:
    take a disk snapshot of the parent VM, the disk snapshot resulting in a child disk for the child VM, the child disk being a delta disk that points to a parent disk associated with the parent VM, the parent disk serving as the parent VM's current running point;
    determine whether the parent disk is a delta disk; and
    if the parent disk is a delta disk:
      copy content of the parent disk to the child disk;
      traverse a disk hierarchy associated with the parent disk to identify a base disk above the parent disk in the disk hierarchy; and
      cause the child disk to point directly to the base disk,
  wherein, upon powering on the child VM on a host system, the host system is configured to:
    compare the content of the child disk against the content of the parent disk; and
    if the content of the child disk does not match the content of the parent disk, recreate the child disk by re-copying the content of the parent disk to the child disk.

12. The computer system of claim 11 wherein the parent VM is a linked clone of another VM that is associated with the base disk.

13. The computer system of claim 11 wherein the parent VM is quiesced immediately after being booted up, such that the parent disk solely comprises I/O writes issued during the parent VM's boot process.

14. The computer system of claim 11 wherein the base disk is the first non-empty disk above the parent disk in the disk hierarchy.

15. The computer system of claim 11 wherein the disk hierarchy modification module is further configured to, in response to a request to fork a second-level child VM from the child VM:
  take a disk snapshot of the child VM, the disk snapshot resulting in a second-level child disk for the second-level child VM, the second-level child disk being a delta disk that points to the child disk;
  copy content of the child disk to the second-level child disk; and
  cause the second-level child disk to point directly to the base disk.

* * * * *